United States Patent [19]

Murphree et al.

[11] Patent Number: 5,732,136
[45] Date of Patent: Mar. 24, 1998

[54] MERCHANT SPECIFIC DEBIT CARD VERIFICATION SYSTEM

[75] Inventors: David L. Murphree, Wills Point; Leslie A. Speck, Rock Wall, both of Tex.

[73] Assignee: RealSource Communications, Inc., Garland, Tex.

[21] Appl. No.: 835,283

[22] Filed: Apr. 9, 1997

Related U.S. Application Data

[63] Continuation of Ser. No. 381,664, Jan. 31, 1995, abandoned.
[51] Int. Cl.$^6$ .................................................. H04L 9/00
[52] U.S. Cl. .................... 380/24; 380/23; 380/25; 380/49; 235/379; 235/380
[58] Field of Search ....................... 380/23, 24, 4, 380/9, 25, 49, 50, 59; 235/379, 380

[56] References Cited

U.S. PATENT DOCUMENTS

| | | |
|---|---|---|
| 3,394,246 | 7/1968 | Goldman ............................... 235/380 |
| 3,956,615 | 5/1976 | Anderson et al. ...................... 380/24 |
| 4,186,871 | 2/1980 | Anderson et al. ...................... 380/24 |
| 4,438,824 | 3/1984 | Mueller-Schloer .................... 380/23 |
| 4,918,631 | 4/1990 | Hara et al. ............................ 364/708.1 |
| 4,978,401 | 12/1990 | Bonomi ................................ 156/64 |
| 5,101,097 | 3/1992 | Conant ................................. 235/449 |
| 5,163,098 | 11/1992 | Dahbura ............................... 380/24 |
| 5,166,501 | 11/1992 | Woolley ............................... 235/488 |
| 5,241,600 | 8/1993 | Hillis .................................... 380/23 |
| 5,255,941 | 10/1993 | Solomon .............................. 283/82 |

*Primary Examiner*—Bernarr E. Gregory
*Attorney, Agent, or Firm*—Dunlap & Codding, P.C.

[57] ABSTRACT

A merchant specific debit card verification system which includes a debit card having at least one ID property stored thereon and a merchant's terminal having at least one ID property stored thereon so that the ID property stored on the debit card relates to the ID properties stored on the merchant's terminal in a predetermined manner. The merchant's terminal retrieves the ID properties stored on the debit card so as to provide a retrieved ID property and then transmits to an intelligent network platform the retrieved ID property and the ID properties stored on the merchant's terminal. The intelligent network platform matches the ID properties stored on the terminal with the retrieved ID property and then transmits a validation whereby the debit card may be used at the merchant's terminal.

8 Claims, 4 Drawing Sheets

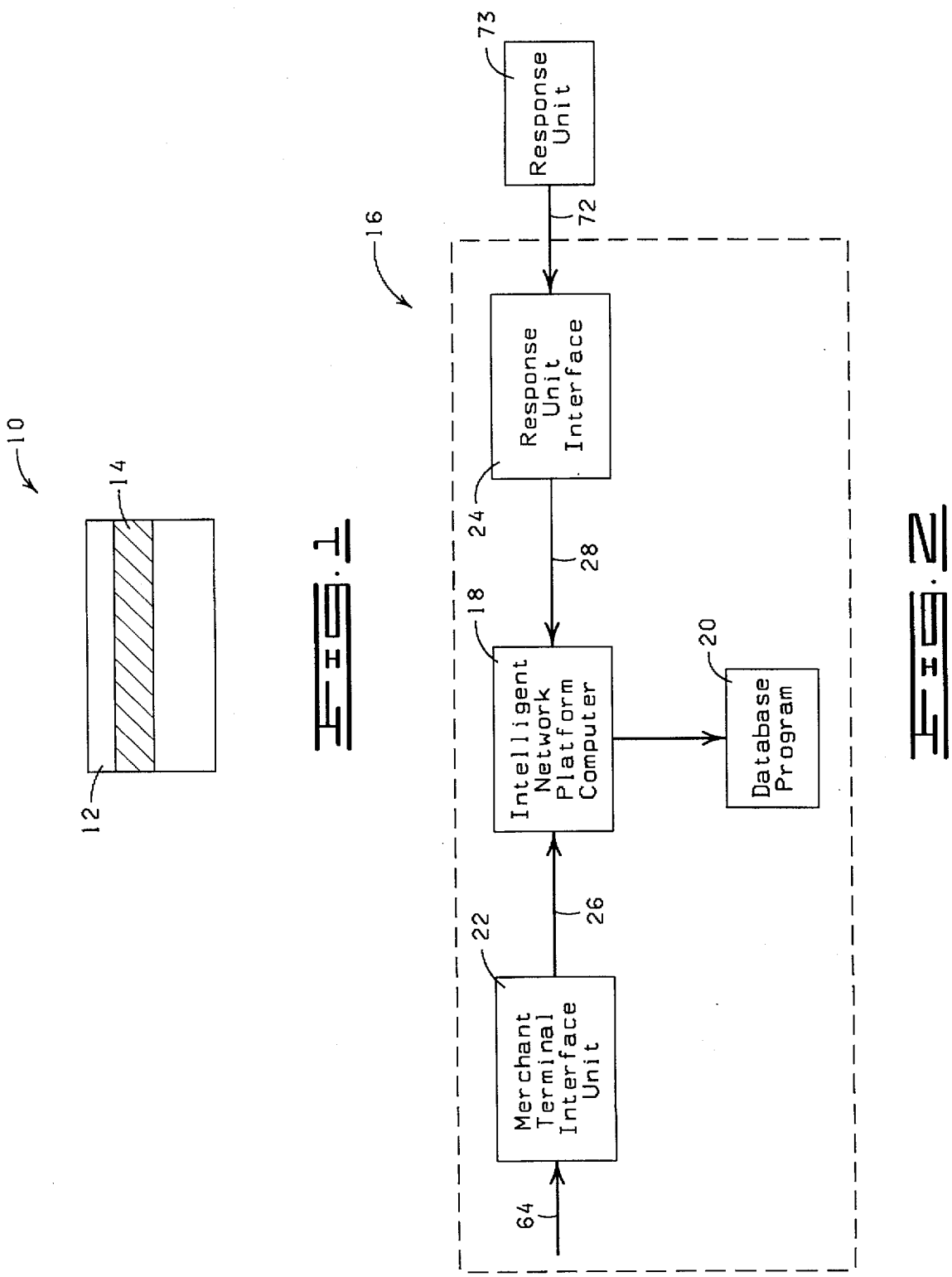

| | |
|---|---|
| $S_0$ | Consumer presents debit card. |
| $S_1$ | Merchant "swipes" debit card through card reader connected to merchants terminal. |
| $S_2$ | Merchant inputs transaction amount via keypad provided with merchants terminal. |
| $S_3$ | M.T. connects with INP and transmits validation access codes and encrypted data field from card. |
| $S_4$ | INP decrypts the encrypted data fields. |
| $S_5$ | INP compares data fields with the associated validation access codes. If the data fields do not match the associated validation access codes, then reject the transaction. If they do match then next step. |
| $S_6$ | INP notifies M.T. of rejection and then closes the connection with the M.T. |
| $S_7$ | INP debits or credits account balance associated with the card number. |
| $S_8$ | INP notifies M.T. of acceptance and then closes the connection with M.T. |
| $S_9$ | M.T. provides receipt. |

FIG. 2

| | |
|---|---|
| $S_0$ | Consumer calls INP |
| $S_1$ | Consumer inputs account number. |
| $S_2$ | INP checks to see if valid account number. If valid then $S_3$, If not then $S_1$. |
| $S_3$ | Consumer inputs destination number. |
| $S_4$ | INP checks to see if destination answers, if so $S_5$, if not cancel. |
| $S_5$ | INP checks to see if account balance = 0 if so, then disconnect, if not then $S_7$. |
| $S_6$ | INP checks to see if account balance = value where only one or two minutes are remaining if so, then $S_8$, if not, then $S_5$ |
| $S_7$ | Warn consumer of remaining time, then go to $S_8$. |
| $S_8$ | Debit account balance at predetermined rate. |

Monitoring cycle

FIG. 8 ered manner.

MERCHANT SPECIFIC DEBIT CARD VERIFICATION SYSTEM

This is a continuation of application Ser. No. 08/381,664 filed on Jan. 31, 1995, now abandoned.

FIELD OF THE INVENTION

The present invention relates to debit cards, and more particularly but not by way of limitation, to methods for controlling the locations where the debit cards may be used.

SUMMARY OF THE INVENTION

Debit cards now exist world-wide: from disposable to rechargeable cards, mag-stripe to chip-imbedded cards, read/write to network validated cards, etc. However, regardless of the type of technology driving the card, two fundamental economic issues exist and remain with debit cards. These two fundamental economic issues are: 1) inventory control and 2) security control.

The present invention directly addresses the above mentioned issues concerning inventory control and security control. Current and traditional debit cards are generally pre-printed and issued with balances which have the equivalent face value as that of cash. Merchants buying these cards are subsequently more exposed to loss through shrinkage and theft. In addition, the merchant must maintain inventory stock of different values of these debit cards well in advance of when the debit cards are actually sold as a retail item, thus restricting working capital. Furthermore, there is no guarantee that these debit cards will not be utilized at another merchant's location.

The invention disclosed herein addresses these two problems. The present invention discloses a method wherein a merchant is provided with a series of non-activated (zero balance) debit cards having a card number and at least one encrypted ID property stored thereon. The merchant is provided with a merchant's terminal having at least one ID property stored thereon wherein the ID property relates to the encrypted ID property stored on the debit card in a predetermined manner.

To activate the debit card with a balance representing an amount a consumer wishes to attribute to the debit card, the card number and the encrypted ID property stored on the debit card are retrieved via the merchant's terminal by an appropriate card reader so as to provide a retrieved card number and a retrieved encrypted ID property. A clerk then inputs an amount a consumer wishes to attribute to the debit card via the merchant's terminal keypad. The merchant's terminal transmits to an intelligent network platform the retrieved card number, the retrieved encrypted ID property, the ID property stored thereon and the amount keyed into the merchant's terminal.

The intelligent network platform works in conjunction with a decryption algorithm to decrypt the retrieved encrypted ID property, so as to provide a retrieved decrypted ID property. The intelligent network platform then tries to match the ID property stored on the merchant's terminal with the retrieved decrypted ID property. If the ID property stored on the merchant's terminal matches the retrieved decrypted ID property, then the card is successfully activated and an account associated with the retrieved card number will be credited with the amount keyed into the merchant's terminal by the clerk. If the ID property stored on the merchant's terminal does not match the retrieved decrypted ID property, then the card is not successfully activated and the account associated with the retrieved card number will not be credited with the amount keyed into the merchant's terminal.

Upon successful activation of the debit card, the consumer may use the activated debit card for the purchase of goods or services, principally from participating retail locations.

The merchant no longer has a large initial expenditure since the non-activated debit cards have no initial intrinsic value. The consumer can not use the debit card at an unauthorized location since the debit card can only be used at terminals encoded with the correct ID property. Theft is no longer a concern since the non-activated debit cards have very little value.

BRIEF DESCRIPTION OF THE DRAWINGS

FIG. 1 is a rear view of a debit card for use in the present invention.

FIG. 2 is a schematic, diagrammatic view of an intelligent network platform.

FIG. 7 is a diagrammatic view illustrating a preferred sequence of steps to be followed when using the debit card of FIG. 1 to make a transaction.

FIG. 8 is a diagrammatic view illustrating a preferred sequence of steps to be followed when using the debit card of FIG. 1 for making long distance telephone calls.

DESCRIPTION OF THE PREFERRED EMBODIMENT

Figure 3:
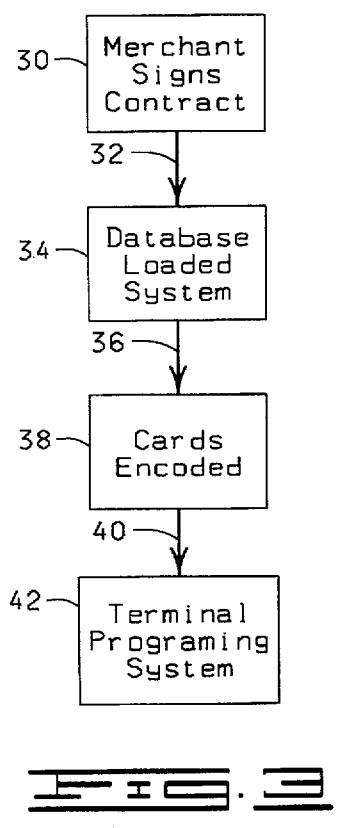
FIG. 3 is a flow chart illustrating a preferred sequence of steps to be followed in the distribution of the debit card of FIG. 1.

Shown in FIG. 1 and designated by the general reference numeral 10 is a debit card for use in the present invention. The debit card 10 comprises a card 12 which has a magnetic stripe 14 containing information which is capable of being read by an appropriate card reader (not shown) such as the card reader provided with a Verifone Trans 330 merchant's terminal provided from Verifone, Inc. of Three Lagoon Drive, Suite 400, Redwood City, Calif. 94065. The information contained on the magnetic stripe comprises a card record, which preferably contains the following encrypted data fields: merchant ID and card number. As explained below, the card record may further contain the following optional encrypted data fields: terminal ID and store ID.

Debit cards are well known in the art. The debit card 10 may be any type of debit card.

As shown in FIG. 2, an intelligent network platform 16 is maintained for the use and the activation of debit cards, such as the debit card 10. The intelligent network platform 16 is comprised of a computer 18 which is loaded with a database program 20, the computer 18 being connected to a merchant's terminal interface unit 22 and to a response unit interface 24 via signal paths 26 and 28 respectively. The computer 18 may be a DOS or UNIX based computer such as an IBM PS/2. The database program 20 may be a program developed from a developer's toolkit, such as VOS available from Parity Software of 870 Market St, #1155, San Francisco, Calif. 94102. The program developed from the developer's toolkit, such as VOS, may be selectively customizable as is customary in the art. The merchant's terminal interface unit 22 may be a modem such as a Hayes—compatible modem obtainable from Verifone. The response unit interface 24 may be a unit such as the D/240SC-T1 obtainable from Dialogic Corp. of 300 Littleton Rd, Parsippany, N.Y. 07054.

FIG. 3 shows a preferred sequence of steps followed when distributing debit cards, such as the debit card 10, to a merchant. The merchant signs a contract 30 specifying certain terms such as: quantity of debit cards purchased; debit card price per unit; debit card custom features; merchant ID; card numbers and originating telephone number. The contract 30 is transmitted along signal path 32 to a database loading system 34 where the terms from the contract 30 are loaded into the database 20. Optionally, the contract may contain and the database may be loaded with the following terms: store ID, terminal ID or retailer greeting prompt.

After the contract terms are loaded into the database 20 by the database loading system 34, the merchant ID, store ID, terminal ID, card number and originating telephone number terms are transferred via signal path 36 to a card encoding system 38 wherein the above stated terms are encoded onto the magnetic stripe 14 of the debit card 10. Afterwards, the merchant ID, store ID and terminal ID terms are transmitted along signal path 40 to a terminal programming system 42 wherein the merchants terminals are programmed with ID properties which corresponds to the merchant ID, store ID and terminal ID fields stored on the debit card 10 in a predetermined manner. Signal paths 32, 36 and 40 could be either manual or electronic. Furthermore, the database loading system may be either manual or electronic. For example, the database loading system may comprise people which read the contract 30 and then type the terms into the database 20 via a keyboard. Encoding debit cards, such as the debit card 10, is well known in the art. However, a debit card encoding service is available from FastCards, Inc. which can be located at 903 North Bowser Dr., St. 200, Richardson, Tex. 75081.

Figure 4:
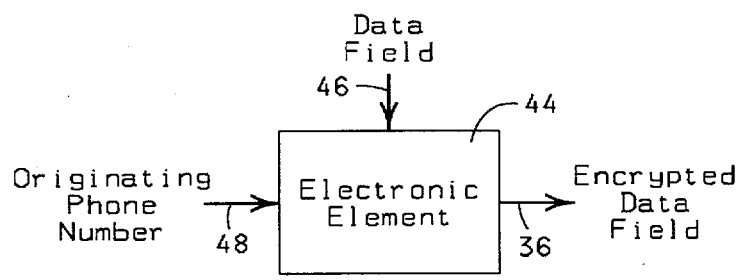
FIG. 4 is a diagrammatic view illustrating the creation of the encrypted data field.

Now referring to FIG. 4, the generation of the encrypted data fields is accomplished by an electronic element 44, which is preferably a microprocessor that has been programmed with an encryption algorithm. The electronic element 44 receives as inputs a data field to be encrypted and the originating telephone number via signal paths 46 and 48. The electronic element 44 then produces the encrypted data field in accordance with the encryption algorithm and the data field to be encrypted and the originating phone number inputs. The encrypted data field is output via signal path 36 to the card encoding system 38 wherein the encrypted data field is encoded onto the magnetic stripe 14 of the debit card 10.

The encryption algorithm may be any of a number of encryption algorithms which are known in the art. For example, an encryption algorithm may generate the encrypted data field by alternating the characters of the two inputs. Alternatively, the encryption algorithm may concatenate the two inputs to generate the encrypted data field. Although the two preferred inputs are the data field to be encrypted and the originating telephone number, it is to be understood that the present invention is not limited to only using either or both of these inputs. For example, the encrypted data field may be generated using the data field to be encrypted and using a date or a time as the two inputs.

Figure 5:
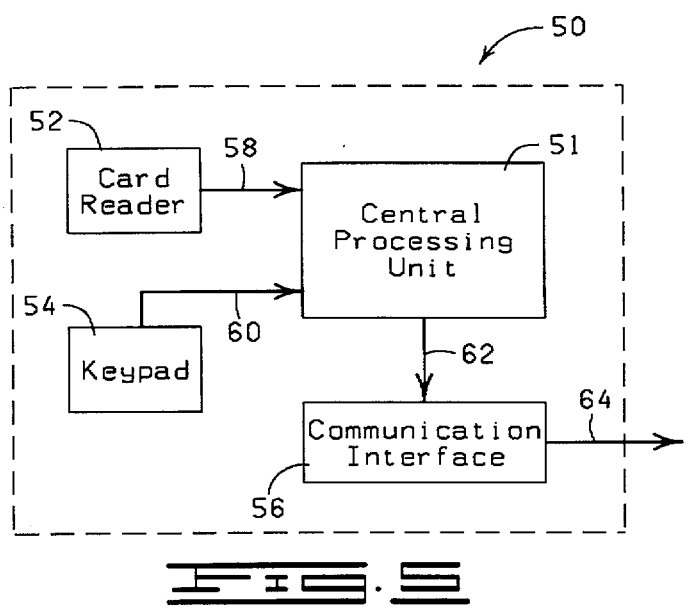
FIG. 5 is a schematic, diagrammatic view of a merchant's terminal for use in the present invention.

FIG. 5 shows a merchant's terminal 50 which has been programmed with an ID property which corresponds in a predetermined manner with the merchant ID field encrypted on the debit card 10. The merchant's terminal is provided with a central processing unit 51, a card reader 52, a keypad 54 and a communication interface 56. The card reader 52, the keypad 54 and the communication interface 56 are connected to the central processing unit 51 via respective signal paths 58, 60 and 62.

When making a transaction, the debit card 10 is passed through the card reader 52 to read the encrypted data fields, such as merchant ID and card number for example, which are stored on the magnetic stripe 14 of the debit card 10. The encrypted data fields, merchant ID and card number, are transmitted along signal path 58 to the central processing unit 51. A transaction amount is then punched into the keypad 54 which transmits the transaction amount to the central processing unit 51 via signal path 60.

The communication interface 56 then connects with the merchant terminal interface unit 22 (FIG. 2) of the intelligent network platform 16 via signal path 64. The encrypted data fields, merchant ID and card number, along with the transaction amount and the ID property are then transmitted sequentially along signal paths 62, 64 and 26 to the intelligent network platform computer 18. The intelligent network platform computer 18 operates in accordance with a decryption algorithm 66 (FIG. 6) which decrypts the encrypted data fields, card number and merchant ID. The merchant ID data field from the debit card 10 is then compared with the ID property programmed into the merchant's terminal 50. If the two codes match, then the transaction may continue. However, if the two codes do not match, then the transaction is not allowed to proceed.

If the two codes match and the transaction is allowed to continue, the intelligent network platform computer 18 debits or credits an account balance associated with the card number by the transaction amount. The merchant's terminal 50 is then notified in reverse by the intelligent network platform computer 18 via sequential signal paths 26 and 64 wherein the merchant's terminal 50 provides a receipt for the transaction.

In this manner, the merchant can be assured that the debit card 10 may not be used except at merchant's terminals, such as the merchant's terminal 50, authorized by the merchant. That is, the debit card 10 may only be used at merchant's terminals that have been programmed with an ID property that corresponds in a predetermined manner to the ID property stored on the debit card 10. The use of the debit card 10 may be confined to a particular store of a retail chain by matching the optional store ID field on the debit card 10 with the ID property relating to the optional store ID field stored on the merchant's terminal 50. The use of the debit card 10 may be further confined to a particular merchant's terminal 50 in a store by matching the optional terminal ID field on the debit card 10 with the optional ID property relating to the terminal ID field stored on the merchant's terminal 50.

Figure 6:
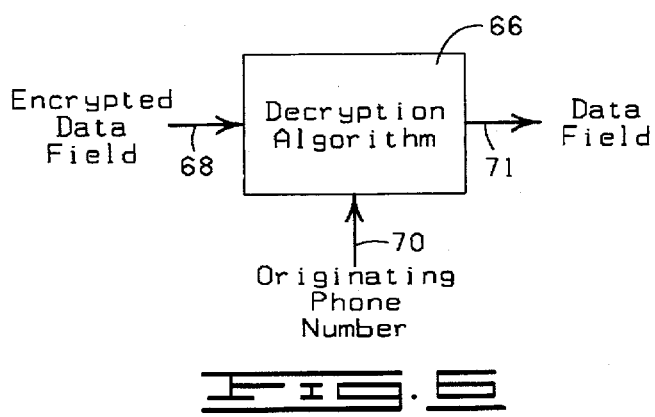
FIG. 6 is a diagrammatic view illustrating the decryption of the encrypted data field.

As shown in FIG. 6, the decryption algorithm 66 receives a first input via signal path 68 and a second input via signal path 70 and outputs a decrypted data field via signal path 71. The first input is preferably the encrypted data field and the second input is preferably the originating telephone number which is sensed from a telephone line where the connection from the merchant's terminal 50 originated. The sensed originating telephone number must be identical to the originating telephone number which was used in the encryption of the encrypted data field. In the event that the two originating telephone numbers are not identical, then the encrypted data field will not be decrypted properly.

The above stated sequence of steps followed when making the transaction as set forth above are summarized in the step chart of FIG. 7. The consumer presents the debit card 10 to the merchant at a step $S_0$. At a step $S_1$, the Merchant swipes the debit card 10 through the card reader 52 which is connected to the merchant's terminal 50. The merchant inputs the transaction amount via the keypad 54 which is provided with the merchant's terminal 50, at a step $S_2$.

The merchant's terminal 50 connects with the intelligent network platform 16 and then transmits to the intelligent network platform 16 the ID properties which are stored on the merchant's terminal 50 and the encrypted data fields which are stored on the debit card 10, at a step $S_3$. At a step $S_4$, the intelligent network platform's decryption algorithm 66 then decrypts the encrypted data fields.

At a step $S_5$, the intelligent network platform 16 compares the data fields, such as merchant ID, terminal ID and store ID, with the associated ID properties. If the data fields do not match the associated ID properties then the transaction is rejected. At a step S6, the intelligent network platform 16 notifies the merchant's terminal 50 of the rejection of the transaction and then closes the connection with the merchant's terminal 50. However, if the data fields do match the associated ID properties, then the intelligent network platform 16 accepts the transaction and debits or credits the account balance associated with the card number, at a step $S_7$. The intelligent network platform 16 notifies the merchant's terminal 50 of the acceptance of the transaction and then closes the connection with the merchant's terminal 50, at a step $S_8$. And at a step $S_9$, the merchant's terminal provides a receipt for the consumer.

Customizing a merchant's terminal for a particular merchant is well known in the art. The merchant may be provided with any merchant's terminal which may be programmed with ID properties, such as the Verifone Trans 330. The Verifone Trans 330 may be provided with the ID properties preprogrammed. That is, Verifone will customize the merchant's terminal 50 for the merchant.

The term "transaction" as used herein is intended to mean any transfer of value between two entities, such as the consumer and the merchant. For example, the transaction would occur when the consumer would be adding value to the debit card 10 or when the consumer would be buying goods or services with the debit card 10.

The debit card 10 may further be used for making long distance calls. Referring again to FIG. 2, when the debit card 10 is used for making long distance calls, the consumer calls into the response unit interface 24 of the intelligent network platform 16 via signal path 72 from a response unit 73, such as a touch tone telephone. Upon connection, the consumer then punches an account number into the response unit 73 which is transmitted to the response unit interface 24 via signal path 72.

The account number is transmitted from the response unit interface 24 to the intelligent network platform computer 18 via signal path 28 where the intelligent network platform computer 18 checks the validity of the account number punched in by the consumer. If the account number is a valid number, then the consumer is prompted via signal path 72 to enter in a destination telephone number. If the account number is not a valid number, then the consumer is prompted via signal path 72 to re-enter the account number.

The consumer then punches the destination number into the response unit 73 which transmits the destination number to the response unit interface 24 via signal path 72. The response unit interface 24 then places the call for the consumer while the intelligent network platform computer 18 monitors the call and debits the account balance associated with the account number. While monitoring the telephone call, the intelligent network platform computer 18 monitors the account balance and notifies the consumer via signal paths 28 and 72 when 1 or 2 minutes of value is remaining in the consumer's account. When the consumers account balance reaches zero, the consumer is disconnected.

The sequence of steps for using the debit card 10 for making long distance telephone calls is illustrated in FIG. 8. As shown in FIG. 8, the consumer calls the intelligent network platform 16, which answers either manually or automatically, at a step $S_0$. At step $S_1$, the consumer enters in the account number which associates the consumer with the respective account. The intelligent network platform computer 18 checks the validity of the account number punched in by the consumer, at a step $S_2$. If the account number is a valid number, then the consumer is prompted to enter in a destination telephone number, at a step $S_3$. If the account number is not a valid number, then the consumer is prompted to reenter the account number, at a step $S_1$. At a step $S_4$, the intelligent network platform 16 checks to see if the destination answers. If the destination does not answer the telephone, then the process is cancelled. However, if the destination does answer the telephone, either automatically or manually, then the intelligent network platform 16 enters into a monitoring cycle starting at step $S_5$.

At step $S_5$, the intelligent network platform 16 checks to see if the consumer's account balance is equal to zero. If the consumer's account balance is equal to zero, then the intelligent network platform disconnects the call. However, if the consumer's account balance is not equal to zero, then the intelligent network platform executes the next step ($S_6$) wherein the intelligent network platform checks to see if there is only a few minutes worth of value remaining in the consumer's account. If there is only a few minutes worth of value remaining in the consumer's account, then the intelligent network platform 16 warns, either audibly or visually, the consumer of the remaining time, at a step $S_7$, then debits the consumer's account at a step $S_8$. If there is more than a few minutes worth of value remaining in the consumer's account, then the consumer's account balance is debited at a step $S_8$. After step $S_8$, the sequence repeats starting at step $S_5$.

Changes may be made in the steps or sequence of steps of the methods described herein without departing from the spirit and the scope of the invention as defined in the following claims.

What is claimed is:

1. A method of making a transaction, the method comprising the steps of:
   a. providing a debit card having at least one ID information stored thereon;
   b. providing a terminal having at least one ID information stored thereon prior to the transaction wherein the ID information stored on the debit card relates to the ID information stored on the terminal in a predetermined manner;
   c. retrieving via the terminal the ID information stored on the debit card so as to provide a retrieved ID information;
   d. transmitting to a computer the retrieved ID information and the ID information stored on the terminal;
   e. matching via the computer the ID information stored on the terminal with the retrieved ID information; and
   f. transmitting via the computer a validation to the terminal.

2. The method of claim 1 wherein the ID information is selected from a group of ID information consisting of merchant ID, terminal ID and store ID.

3. A method of making a transaction, the method comprising the steps of:
   a. providing a debit card having at least one encrypted ID information stored thereon;
   b. providing a terminal having at least one ID information stored thereon wherein the ID information stored on the debit card relates to the ID information stored on the terminal in a predetermined manner;
   c. retrieving via the terminal the encrypted ID information stored on the debit card so as to provide a retrieved encrypted ID information;
   d. transmitting to a computer the retrieved encrypted ID information and the ID information stored on the terminal;
   e. decrypting via the computer the retrieved encrypted ID information so as to provide a retrieved decrypted ID information;
   f. matching via the computer the ID information stored on the terminal with the retrieved decrypted ID information; and
   g. transmitting via the computer a validation to the terminal.

4. The method of claim 3 wherein the encrypted ID information is selected from a group of encrypted ID information consisting of merchant ID, terminal ID and store ID.

5. An apparatus of making a transaction, the apparatus comprising:
   a debit card having at least one ID information stored thereon;
   a terminal having at least one ID information stored thereon prior to the transaction wherein the ID information stored on the terminal relates to the ID information stored on the debit card in a predetermined manner;
   card reader means communicating with the terminal for retrieving the ID information stored on the debit card;
   computer means disposed remotely from the terminal for matching the ID information stored on the terminal with the ID information stored on the card to determine whether the transaction is valid; and
   communication means for transmitting the ID information stored on the debit card and the ID information stored on the terminal to the computer means such that the ID information stored on the debit card and the ID information stored on the terminal can be matched by the computer means.

6. The apparatus of claim 5 wherein the ID information stored on the debit card is further defined as being selected from a group of ID information consisting of a merchant ID, a terminal ID and a store ID.

7. A method for making long distance telephone calls using a debit card verification system, the method comprising the steps of:
   a. providing a debit card having at least one encrypted ID information stored thereon which is related to an ID information stored on a terminal in a predetermined manner;
   b. providing a response unit;
   c. connecting, via the response unit, to a computer;
   d. transmitting, from the response unit, a destination telephone number and an account number to the computer;
   e. checking, by the computer, the validity of the account number transmitted from the response unit;
   f. generating a signal indicative of the validity or invalidity of the account number wherein upon the signal being indicative of an invalid account number the connection between the response unit and the computer is interrupted and upon the signal being indicative of a valid account number, dialing, by the computer, the destination telephone number transmitted by the response unit so that a telephone call is placed by an individual who is calling from the response unit.

8. The method of claim 7 wherein the encrypted ID information is selected from a group of encrypted ID information consisting of merchant ID, terminal ID and store ID.

* * * * *